Feb. 23, 1965
C. GATTO
3,170,564
CONVEYOR APPARATUS
Filed April 2, 1963
3 Sheets-Sheet 1
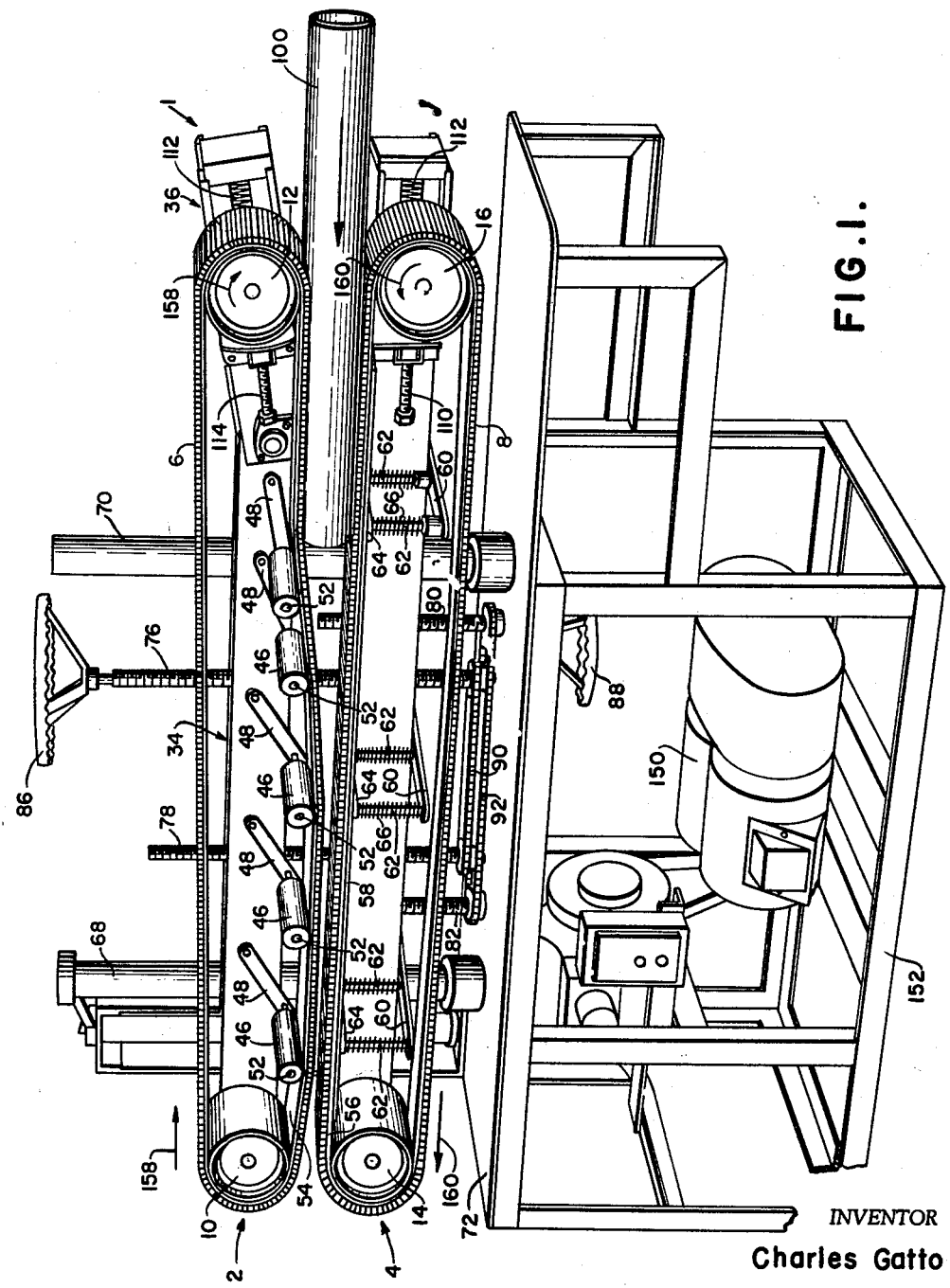
FIG.I.
INVENTOR
Charles Gatto
BY Clive H. Bramson
ATTORNEY Feb. 23, 1965
C. GATTO
3,170,564
CONVEYOR APPARATUS
Filed April 2, 1963
3 Sheets-Sheet 2
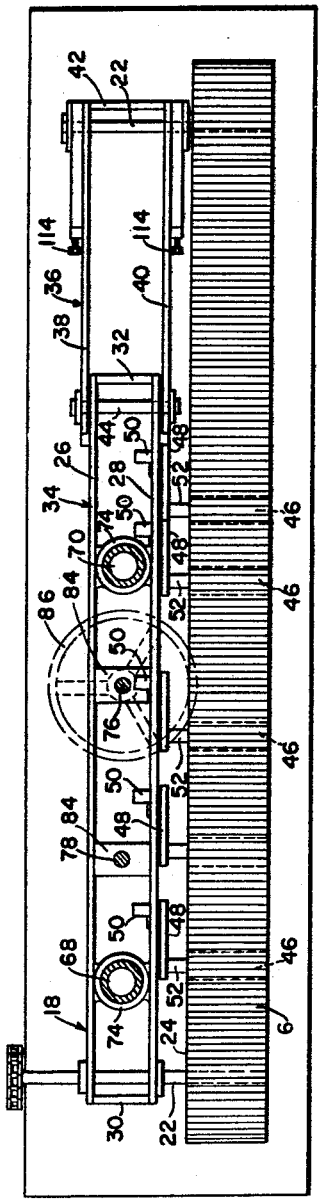
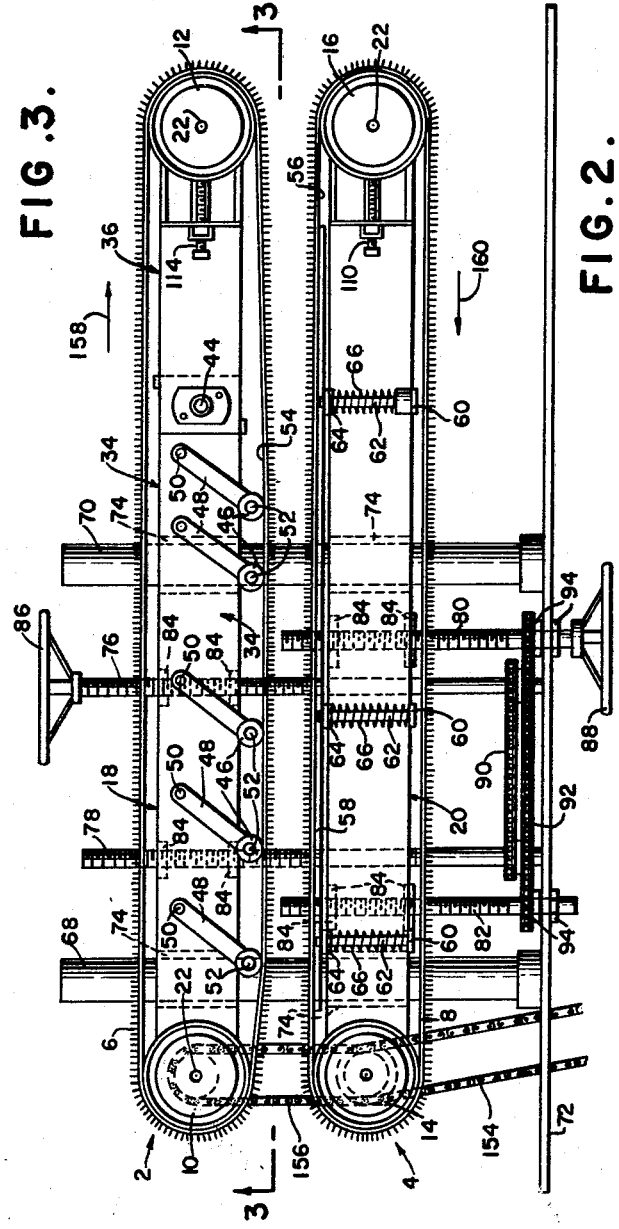
INVENTOR
Charles Gatto
BY Clive H. Bramson
ATTORNEY Feb. 23, 1965   C. GATTO   3,170,564
CONVEYOR APPARATUS
Filed April 2, 1963   3 Sheets-Sheet 3
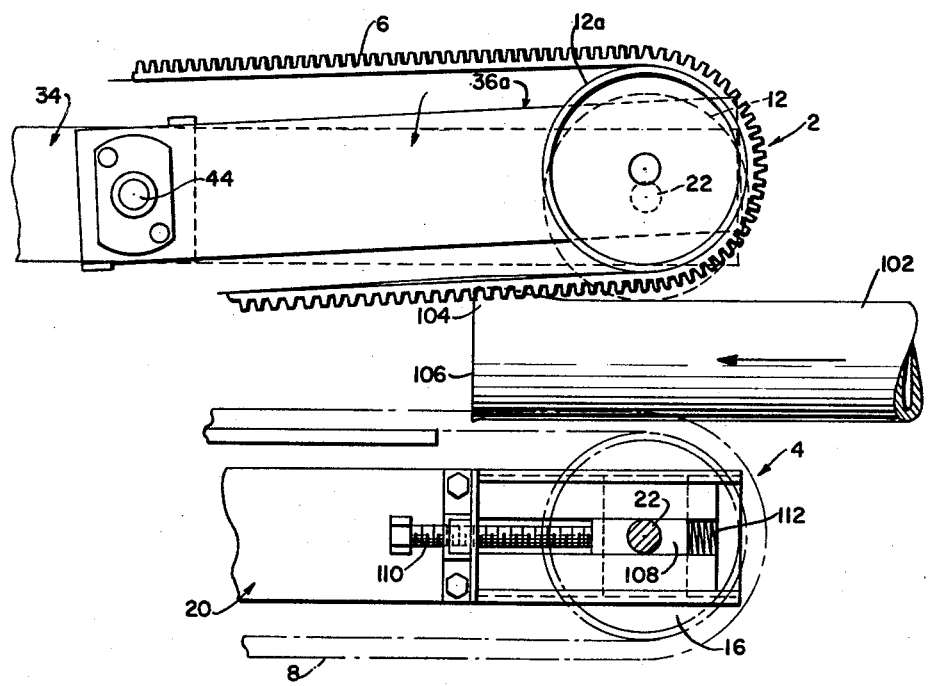
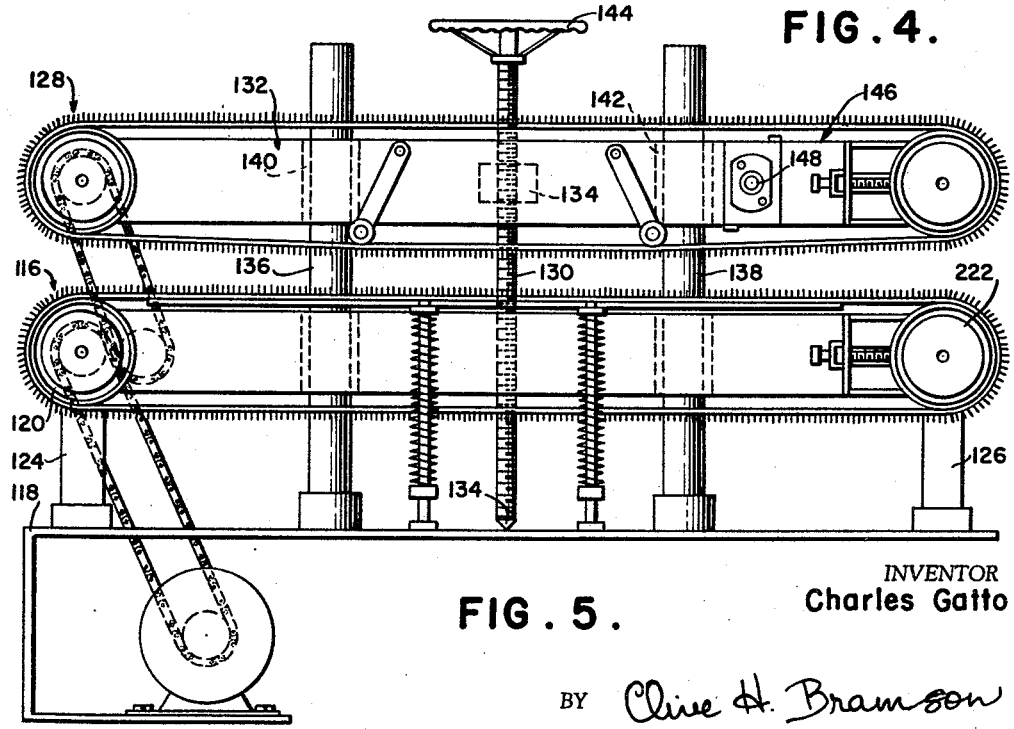
FIG. 4.
FIG. 5.
INVENTOR
Charles Gatto
BY Clive H. Bramson
ATTORNEY United States Patent Office 3,170,564
Patented Feb. 23, 1965

3,170,564
CONVEYOR APPARATUS
Charles Gatto, 77 Florida St., Farmingdale, N.Y.
Filed Apr. 2, 1963, Ser. No. 269,917
10 Claims. (Cl. 198—165)

This invention relates in general to material handling equipment and in particular to apparatus for facilitating the handling and conveying of extruded tubing and the like away from the extrusion source. The invention further relates more specifically to machinery capable of transporting such extruded products to regions proximate with respect to the extrusion source where fabrication and treatment of said products is effectuated, said machinery having features in combination therewith whereby jamming of the machine and/or damage to the products of extrusion is precluded notwithstanding the existance of irregularities or oversized imperfections in the product itself.

Apparatus of the instant character are presently utilized to the end of conveying products of extrusion, e.g., plastic tubing, away from the extrusion source as said tubing egresses from the mouth of the extrusion machine, this conveying function being essentially directed to the prevention of sagging and distortion which would otherwise occur as the tubing emerges soft, hot and unsupported from said machine. Accordingly, the requirement of means for conveying the extruded product away from the source thereof and on the plane of said source, will be readily appreciated.

Consonant with the foregoing, the instant invention has for an object the provision of a novel apparatus for facilitating the handling and conveying of extrusion products away from the extrusion source.

Another object of the present invention is to provide an apparatus for transporting extruded materials between a pair of spaced endless deck conveyors, said apparatus being conveniently capable of handling materials of substantial variation with respect to cross-sectional shape and dimension.

A further object of the present invention is the provision of an improved apparatus of the foregoing character which will not jam notwithstanding the prevalence of bulk material clinging to the initial run of the extruded product, said bulk material being readily receivable through the conveyor decks of the apparatus.

A still further object of the instant invention is the provision of a new and useful conveyor apparatus including means for resiliently urging the pair of deck conveyor elements thereof toward one another whereby the products of extrusion passing therebetween will be safeguarded against damage.

Still another object of the present invention is to provide simplified means for automatically adjusting the parallel spaced relation of the pair of deck conveyor means thereof to thus compensate for variations of the size of materials passing therebetween.

A further object of this invention is to provide an apparatus including endless deck conveyor means trained about rearward and forward rotatable drums, manual adjustment of the tautness of said conveyor means being readily accomplished.

A still further object of the instant invention resides in the provision of a new and useful extrusion product handling apparatus which is relatively simple of construction, strong, durable and unlikely to become jammed or clogged thereby substantially minimizing maintenance problems.

Other objects and advantages of the invention will become apparent upon reading the following description taken in conjunction with the accompanying drawings in which:

FIGURE 1 is a perspective view of the conveyor apparatus according to the present invention, an extruded length of plastic tubing being introduced at the forward end thereof, the base support member and the driving means being shown therein;

FIGURE 2 is a side elevational view of the foregoing apparatus;

FIGURE 3 is a plan view of the upper endless deck conveyor taken along line 3—3 of FIGURE 2;

FIGURE 4 is an enlarged fragmentary side elevation of the forward end of the invention illustrating the pivotal feature of the conveyor means, said feature being operative in precluding jamming notwithstanding bulk attached to the initial run of the extruded material; and FIGURE 5 is a side elevational view of an alternate embodiment of the present invention.

It will be understood that the foregoing general objectives and the following detailed description as well are exemplary and explanatory but are not restrictive of the invention. Referring now in detail to the present preferred embodiment of the invention illustrated by way of example in the accompanying drawings, FIGURE 1 shows the conveyor apparatus designated generally by numeral 1 in operavite position, that is, with a length of tubing 2 being transported thereby.

With reference to FIGURES 2 and 3 of the drawings it will be seen that the essential elements of the invention comprise, in combination, upper and lower elongated endless deck conveyor means shown generally by numerals 2 and 4, respectively, said conveyor means including flexible belts 6 and 8 trained about rearward and forward rotatable drums, 10, 12 and 14, 16, respectively, said upper and lower conveyor means being disposed in spaced, superposed, substantially parallel relation.

Elongated support structures designated generally by numerals 18 and 20 are positioned longitudinally as shown with respect to said upper and lower conveyor means, respectively, said rotatable drums being journalled upon shafts 22, said shafts being rotatably supported by said elongated support structures 18 and 20. As observed with reference to FIGURE 3 of the drawings, said support structures are offset with respect to the lateral edges 24 of said flexible belts 6 and 8 and are spaced therefrom, as shown, said support structures being further aligned with the horizontal axes of said respective conveyor means. Upper elongated support structure 18 as shown in FIGURE 3 will be seen to comprise vertically oriented spaced side-plates being connected by end-plates 30, 32 to form a rearward section designated generally by numeral 34. A forward section designated generally by numeral 36 will be seen to comprise vertically oriented spaced side-plates 38 and 40, end-plate 42 providing suport at one end, the other end of said forward section being bifurcated to straddle the side-plates of said rearward section 34 and is pivotally related therewith by pin 44 extending through said plates of said sections as shown in the drawings, the pivotal action thus accomplished being in the vertical plane.

Said lower elongated support structure 20 is formed of a unitary single section comprised of side-plates and end-plates, the pivotal feature of the upper structure being absent therefrom.

Referring now to FIGURES 1, 2 and 3 of the drawings, it will be observed that a series of horizontally aligned rollers 46 are pivotally connected to said rearward section 34 of said upper support structure 18 by L-shaped crankarms 48, pins 50 providing the said pivotal connection and shafts 52 thereof providing rotatable support therefor. It will be further observed that said rollers 46 are disposed transversely of and in engaging relation with the lower horizontal run 54 of belt 6 of said upper conveyor means, said rollers being in pressing relation with said run by reason of gravity acting upon the weight of each roller (approximately 1½ pounds). Accordingly, it will be understood that the rollers impart attributes of firmness and resilience to said conveyor means 2, thus affording certainty of grip with respect to the material passing therebeneath while also permitting upward movement of separate portions of belt 6 in the event of irregularities or abnormally enlarged sections of said extruded material, thus precluding damage to either the conveyor apparatus or to the material itself.

To the end of providing resilient support to upper horizontal run 56 of belt 8, backing-plate 58 is positioned therebeneath and in slidable engagement therewith, said backing-plate being perpendicular with respect to said lower support structure and supported by horizontally disposed bracket-arms 60 and vertical columns 62, said bracket-arms being integral with said lower support structure and normally disposed with respect thereto, said vertical columns 62 being vertically slidable within transverse members 64 which are integrally related with respect to said backing-plate 58. Compression springs 66 provided peripherally of columns 62 and slidably related therewith, are biased against stationary horizontal bracket-arms 60 and transverse members 64, to thereby urge said backing-plate toward engaging relation with run 56 to thus resiliently support said belt 8 as said belt moves thereover during the operation of the apparatus.

With reference to FIGURES 2 and 3, it will be seen that vertical shaft members 68 and 70 mounted upon base support member 72 are slidingly and coaxially disposed within guide-sleeves 74, said guide-sleeves being integrally disposed between the side-plates of said upper and lower elongated support structures as illustrated. Hence it will be appreciated that said upper and lower conveyor means 2 and 4 will be movable in the vertical plane and will be maintained in respective alignment by virtue of said vertical shaft members 68 and 70.

To enable regulation of the height of said conveyor means with respect to said base support member and to permit adjustment of the mutually spaced relation of said conveyor means, adjusting means comprised of vertically disposed threaded support members 76, 78 and 80, 82 are provided, said adjusting means being threadedly received within internally threaded sleeve nuts 84, said sleeve nuts being provided integrally and transversely of said upper and lower support structures and vertically aligned in pairs centrally of the spaced side-plates of said support structures as seen in FIGURES 2 and 3. As will be further observed by reference to said figures, adjusting-wheels 86 and 88, coaxially connected at the ends of threaded support members 76 and 80, respectively, when manually rotated, will through chain linkages 90 and 92, cause threaded support members 78 and 82 to be rotated concurrently therewith and in the angular directions thereof, respectively. Support members 76, 78, 80 and 82, being precluded against vertical movement by reason of base support member 72 upon which support members 76 and 78 rest and through which support members 80 and 82 are rotatably held by collars 94 as shown in FIGURE 2, will occasion the upward and downward movement of said upper and lower support structures as said support members are revolved within said sleeve nuts 84. Accordingly, predetermination of the level of said respective conveyor means with respect to the level of extrusion product feed 100 (see FIGURE 1) and the relative spacing therebetween may be accomplished by manipulation of adjusting-wheels 86 and 88 as described.

The pivotal action of said forward section 36 as related to said rearward section 34 of said upper support structure 18 is more particularly illustrated in the enlarged fragmentary elevation view of FIGURE 4 of the drawings wherein extruded tubing 102 having the bulk of excess preliminary plastic material 104 at the beginning 106 thereof is seen passing between upper and lower conveyor means 2 and 4 of the conveyor apparatus. It will be observed that the solid line representation of said forward section 36a and rotable drum 12a have pivoted about pin 44 and are at an angle with respect to said lower support structure 20, thus forming an enlarged entrance area at the forward end of said conveyor means whereby the extruded tubing 102 is permitted to pass through the conveyor system, jamming of the apparatus and the consequent problems thereof being avoided; damage to the extruded material also being avoided.

With further reference to FIGURE 4, it will be seen that rotatable drum 16 is positionable at various distances of the forward end of lower support structure 20. That is, shaft 22 upon which said drum is rotatably journalled, is slidable within slot 108 provided as shown within said support structure, adjusting set screws 110 being adapted to move said rotatable drum toward the forward end of said support structure. Compression spring 112, located within said slot 108 and disposed between the forward end of said support structure and said rotatable drum, normally biases said drum in the direction of said set screws 110. Accordingly, it will be appreciated that movement of said rotatable drum toward the forward end of said support structure against the opposing force of spring 112 will result in the elimination of slack in said fexible belt 8 to maintain the tautness thereof as desired. It will be appreciated that belt 6 of said upper conveyor means 2 may be tightened or slackened as required by turning adjusting screws 114 whereby movement of rotatable drum 12 within a slot (not shown) in forward section 36 may be effectuated.

An alternate embodiment of the present invention as illustrated in FIGURE 5 of the drawings, includes in substance those features described herein above with respect to the preferred embodiment shown in FIGURES 1–3, lower conveyor means 116 of said alternate embodiment, however, being fixedly positioned with respect to base support member 118, rotatable drums 120, 122 thereof being journalled within bearing blocks 124 and 126, respectively. A further modification included in said alternate embodiment resides in the manner in which the upper conveyor means 128 thereof is supported above said lower conveyor means 116 in parallel, spaced relation therewith. That is, vertically disposed adjusting screw 130 threadedly connected to elongated support structure 132 at threaded sleeve nut 134 supports said elongated support structure by reason of end 134 standing upon base support member 118 in removable contact therewith. As disclosed with respect to the preferred embodiment of the invention, vertically disposed shaft members 136 and 138 which are fixedly connected to said base support member 118 at their respective lower ends are slidingly connected to said elongated support structure 132 through guide sleeves 140 and 142, respectively.

Hence, rotation of adjusting wheel 144 will raise or lower said upper conveyor means 128 to thereby accomplish regulation of the spacing between said upper and lower conveyor means in accordance with the cross sectional dimension of the extrusion product. In the event said extrusion product lacks uniformity of cross section or is possessed of excess bulk material attached to the beginning thereof as herein described and shown with reference to FIGURE 4, said adjusting screw 130 and upper conveyor means 128 will automatically be lifted away from said lower conveyor means 116, said movement being sufficient to copensate for the oversized material passing through said apparatus, this safety feature being in addition to the pivotal arrangement of forward section 146 about pin 148 as disclosed and described heretofore, with respect to the preferred embodiment.

Electric motor 150 (FIGURE 1) mounted upon frame 152 of the conveyor apparatus 1 constitutes the driving means provided to drive the upper and lower endless deck conveyor means 2 and 4. As partially shown in FIGURE 2 of the drawings, chain 154 links said motor and said rotatable drum 14 in drawing relation, chain 156 extending from rotatable drum 14 to rotatable drum 10 being further effective in rotating the latter, to thus cause movement of upper and lower flexible belt 6 and 8 in the directions of arrows 158 and 160, respectively.

Both the structural and operational characteristics of the invention having been described, it will be understood that changes may be made in the form, construction and arrangement of parts from that disclosed herein without in any way departing from the spirit of the invention or sacrificing any of the attendant advantages thereof, provided, however, that such changes fall within the scope of the claims, appended hereto.

What is claimed is:

1. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said sections being pivotally connected, a series of horizontally aligned rotatable rollers pivotably connected to said rearward section of said upper support structure said rotatable rollers being arranged above the engaging the lower horizontal run of said upper conveyor means, and driving means associated with at least one said rotatable drum.

2. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said sections being pivotally related, a backing plate resiliently connected to said lower support structure and perpendicularly disposed with respect thereto, said backing plate being arranged beneath and slidably engaging the upper horizontal run of said lower conveyor means, and driving means associated with at least one said rotatable drum.

3. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said sections being pivotally related, adjusting means associated with said upper and lower conveyor means, said adjusting means being adapted for prepositioning the relative space between said upper and lower conveyor means, and driving means associated with at least one said rotatable drum.

4. Apparatus for facilitating the handling and conveying of extrusion products away from the extrusion source comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said sections being pivotally related, at least one vertically disposed shaft member slidingly connected to said upper and lower support structures, said at least one shaft member being adapted to support said upper and lower conveyor means in vertically aligned relation, and driving means associated with at least one said rotatable drum.

5. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said sections being pivotally related, adjusting means associated with said upper and lower conveyor means, said adjusting means being adapted for pre-positioning the relative space between said upper and lower conveyor means, at least one vertically disposed shaft member slidingly connected to said upper and lower support structures, said at least one shaft member being adapted to support said upper and lower conveyor means in vertically aligned relation, and driving means associated with at least one said rotatable drum.

6. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, said upper support structure being formed of rearward and forward sections, said forward section being shorter in length than said rearward section, said forward and rearward sections being pivotally connected to permit pivoting of said forward section in the vertical plane, a series of horizontally aligned rollers pivotally connected to said rearward section of said upper support structure, said rollers being arranged above and engaging the lower horizontal run of said upper conveyor means, a backing-plate resiliently connected to said lower support structure and perpendicularly disposed with respect thereto, said backing plate being arranged beneath and slidably engaging the upper horizontal run of said lower conveyor means, adjusting means associated with said upper and lower conveyor means, said adjusting means being adapted for prepositioning the relative space between said upper and lower conveyor means, at least one vertically disposed shaft member slidingly connected to said upper and lower support structures, said at least one shaft member being adapted to support said upper and lower conveyor means in vertically aligned relation, and driving means associated with at least one said rotatable drum.

7. Apparatus for facilitating the handling and conveying of extrusion products away from the extrusion source, comprising in combination, upper and lower elongated endless deck conveyor means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, one of said support structures being formed of rearward and forward sections, said sections being pivotally connected, and driving means associated with at least one said rotatable drum.

8. Apparatus for facilitating the handling and conveying of extrusion products away from the extrusion source, comprising in combination, a base support member, upper and lower elongated endless deck conveyor means respectively trained about rearward and forward rotatable drums, said upper and lower conveyor means being disposed in spaced, superposed, substantially parallel relation, an elongated support structure positioned longitudinally of said upper conveyor means, the rotatable drums associated with said upper conveyor means being journalled at the rearward and forward ends of said elongated support structure, the rotatable drums associated with said lower conveyor being rotatably supported by said base support member, at least one vertically disposed shaft member slidingly connected to said elongated support structure, a vertically disposed adjusting screw threadedly connected to said elongated support structure, one end of said at least one vertically disposed shaft member being fixedly connected to said base support member, one end of said vertically disposed adjusting screw being in removable contact with said base support member, and driving means associated with at least one said rotatable drum.

9. Apparatus for facilitating the handling and conveying of extrusion products away from the extrusion source, comprising in combination, upper and lower elongated endless deck conveying means respectively trained about rearward and forward rotatable drums, said upper and lower conveyor means being disposed in spaced, superposed, substantially parallel relation, an upper and lower elongated support structure positioned longitudinally of said upper and lower conveyor means, respectively, said rotatable drums being journalled at the rearward and forward ends of said elongated support structures, a series of horizontally aligned rollers pivotally connected to said upper support structure, said rollers being arranged above and engaging the lower horizontal run of said upper conveyor means, a backing plate resiliently connected to said lower support structure and perpendicularly disposed with respect thereto, said backing plate being arranged beneath and in sliding engagement with respect to the upper horizontal run of said lower conveyor means, adjusting means associated with said upper and lower conveyor means, said adjusting means being adapted for prepositioning the relative space between said upper and lower conveyor means, at least one vertically disposed shaft member slidingly connected to said upper and lower support structures, said at least one shaft member being adapted to support said upper and lower conveyor means in vertically aligned relation, and driving means associated with at least one said rotatable drum.

10. Apparatus for facilitating the handling and conveying of extrusion products away from the extrusion source, comprising in combination, a base support member, upper and lower elongated endless deck conveyor means respectively trained about rearward and forward rotatable drums, said upper and lower conveyor means being disposed in spaced, superposed, substantially parallel relation, an elongated support structure positioned longitudinally of said upper conveyor means, the rotatable drums associated with said upper conveyor means being journalled at the rearward and forward ends of said elongated support structure, the rotatable drums associated with said lower conveyor means being rotatably supported by said base support member, at least one vertically disposed shaft member slidingly connected to said elongated support structure, a vertically disposed adjusting screw threadedly connected to said elongated support structure, one end of said at least one vertically disposed shaft member being fixedly connected to said base support member, one end of said vertically disposed adjusting screw being in removable contact with said base support member, a series of horizontally aligned rollers pivotally connected to said elongated support structure, said rollers being arranged above and engaging the lower horizontal run of said upper conveyor means, and driving means associated with at least one said rotatable drum.

References Cited by the Examiner

UNITED STATES PATENTS

| 2,372,646 | 4/45 | Barnby | 198—165 |
| 2,674,366 | 4/54 | Kindseth | 198—165 |
| 2,682,216 | 6/54 | Shields | 198—165 |

FOREIGN PATENTS 1,189,440  10/59  France.

SAMUEL F. COLEMAN, *Primary Examiner.*

WILLIAM B. LA BORDE, *Examiner.*